United States Patent [19]

Katsumata

[11] Patent Number: 5,504,725

[45] Date of Patent: Apr. 2, 1996

[54] OPTICAL DISK APPARATUS FOR READING AND WRITING DATA ON AN OPTICAL DISK HAVING TRACKS FORMED BY ADJACENT GROOVES AND LANDS

[75] Inventor: Makoto Katsumata, Ichikawa, Japan

[73] Assignee: Kabushiki Kaisha Toshiba, Kawasaki, Japan

[21] Appl. No.: 300,562

[22] Filed: Sep. 6, 1994

[30] Foreign Application Priority Data

Sep. 7, 1993 [JP] Japan ..................................... 5-221601

[51] Int. Cl.$^6$ ....................................................... G11B 7/00
[52] U.S. Cl. ..................................... 369/44.28; 369/44.32; 369/44.11
[58] Field of Search ..................................... 369/44.28, 32, 369/44.26, 44.34, 44.29, 41, 44.32, 44.11, 54, 56; 250/201.5; 360/77.03, 78.01, 78.05

[56] References Cited

U.S. PATENT DOCUMENTS

| | | | |
|---|---|---|---|
| 5,072,434 | 12/1991 | Uchikoshi et al. | 369/44.28 |
| 5,253,239 | 10/1993 | Edahiro et al. | 369/44.28 |
| 5,311,490 | 5/1994 | Matoba et al. | 369/44.29 X |
| 5,398,221 | 3/1995 | Ogawa | 369/44.28 X |

FOREIGN PATENT DOCUMENTS

| | | |
|---|---|---|
| 5-89485 | 4/1993 | Japan . |
| 5274690 | 10/1993 | Japan . |

*Primary Examiner*—Aristotelis Psitos
*Assistant Examiner*—Thang V. Tran
*Attorney, Agent, or Firm*—Cushman, Darby & Cushman

[57] ABSTRACT

In an optical disk apparatus, an optical head is moved in a radial direction of an optical disk having a track spirally or concentrically formed in a state that a groove and a land are adjacent, and detecting device for detecting reflected light from the optical disk, and a track error signal, which is obtained by detecting light from the optical disk along with the movement of the optical head, and a track addition signal are generated, a signal A showing a central position of a groove, a signal C showing a central position of a land, signals B and D showing a groove-land changing position are generated based on the track error signal and the track addition signal, and a direction of the movement of the optical head is detected in accordance with the generation order of the signal A showing a central position of a groove, the signal C showing a central position of a land, and the signals B and D showing a groove-land changing position. Whereby, the direction of the movement of the optical head with respect to the optical disk can be correctly detected.

16 Claims, 9 Drawing Sheets

FIG. 6A LAND-GROOVE STATE
FIG. 6B TRACK ERROR SIGNAL
FIG. 6C TRACK ADDITION SIGNAL
FIG. 6D TRACK DETECT SIGNAL
FIG. 6E HIGH SPEED DATA SIGNAL
FIG. 6F TRACK PULSE SIGNAL
FIG. 6G TRACK ADDITION PULSE SIGNAL
FIG. 6H DATA DETECT SIGNAL
FIG. 6I GROOVE-LAND SIGNAL
FIG. 6J DIRECTION SIGNAL

OPTICAL DISK APPARATUS FOR READING AND WRITING DATA ON AN OPTICAL DISK HAVING TRACKS FORMED BY ADJACENT GROOVES AND LANDS

BACKGROUND OF THE INVENTION

1. Field of the Invention

The present invention relates to an optical disk apparatus for detecting direction of a relative movement between a laser beam of an optical head used in an optical device, which records data to an optical disk and reproduces data from the optical disk.

2. Description of the Related Art

In an image filing system, an optical disk apparatus is used. In the optical disk apparatus, data is recorded on a track or recorded data is regenerated while an optical disk in which a groove and a land (recording track) are spirally or concentrically formed is rotating. In the land of the optical disk, there is provided a header portion having a pre-pit, which is formatted in advance, and a pit continuous to the head portion is formed, thereby recording data.

As the above-mentioned apparatus, there is conventionally proposed an apparatus for detecting a moving direction to the optical disk of the optical head (see Japanese Patent Application KOKAI Publication No. 5-89485).

More specifically, in an optical disk apparatus in which the optical head is moved in a radial direction of the optical disk, light from the optical disk is detected along the movement of the optical head, thereby obtaining a track error signal (push-pull signal) and a track addition signal, a groove detection pulse is output in response to the track addition signal, a track detection pulse is output in response to the track error signal so that the moving direction of the optical head is detected in response to the groove detection pulse and the track detection pulse.

However, according to the above-mentioned detecting apparatus, when a signal with a low reflection rate serving as a preformat signal, and a signal with a high reflection rate, serving as a recording data signal, are provided on the optical disk, and a portion having no groove (discontinuous groove portion) is formed in the preformat portion, it is difficult to remove these signals from the track addition signal and output a correct groove detection signal, and an erroneous direction signal is output.

In other words, there is a possibility that the moving direction of the optical disk of the optical head will be erroneously detected by an influence of pits other than the groove on the optical disk and concave-convex portions.

As mentioned above, there is conventionally the problem in which the moving direction of the optical disk of the optical head cannot be correctly detected.

SUMMARY OF THE INVENTION

An object of the present invention is to provide an apparatus which can correctly detect a moving direction relative to an optical disk of an optical head.

According to a first aspect of the present invention, there is provided an optical disk apparatus for reading data from an optical disk having tracks where data is recorded. The tracks are formed by grooves and lands in an adjacent state, the optical disk apparatus comprising: beam-focusing means for focusing a light beam on the optical disk; a detector for detecting a light beam from the optical disk and for outputting a detection signal; moving means for moving the optical beam-focusing means in a direction across the track of the optical disk; first signal generating means for generating a track error signal and a track addition signal to the track of the optical disk in response to the detection signal, and the output from the detector; second signal generating means for generating a groove position signal representing a central position of the groove, a land position signal representing a central position of the land, and groove-land changing signals representing a groove-land changing positions in response to the track error signal and the track addition signal generated by the first signal generating means; and detecting means for detecting a moving direction of the beam-focusing means in accordance with the generation sequence of the groove position signal, the land position signal, and the groove-land changing signals generated by the second signal generating means.

According to a second aspect of the present invention, there is provided an optical disk apparatus for reading data from an optical disk having tracks on which data is recorded. The tracks are formed by grooves and lands in an adjacent state, the optical disk apparatus comprising: beam-focusing means for focusing light beam on the optical disk; a detector for detecting a light beam from the optical disk and for outputting a detection signal; moving means for moving the optical beam-focusing means in a direction across the track of the optical disk; first signal generating means for generating a track error signal and a track addition signal to the track of the optical disk in response to the detection signal, and the output from the detector; second signal generating: means for generating groove-land signals representing groove-land changing positions wherein each indicates a changing position from the groove to the land and a changing position from the land to the groove, a first signal representing a positive peak position of the track error signal, and a second signal representing a negative peak position of the track error signal in response to the track error signal and the track addition signal generated by the first signal generating means; and detecting means for detecting a moving direction of the beam-focusing means in accordance with the generation order of the groove-land signals, the first signal and the second signal generated by the second signal generating means.

According to a third aspect of the present invention, there is provided an optical disk apparatus for reading data from an optical disk having tracks in which data is recorded. The tracks are formed by grooves and lands in an adjacent state, the optical disk apparatus comprising: a beam-focusing means for condensing light beam on the optical disk; a detector for detecting a light beam reflected from the optical disk and for outputting a detection signal; moving means for moving the beam-focusing means in a direction perpendicular to the light axis of the beam-focusing means and in a direction crossing the track of the optical disk; amplifying means for converting the detection signal from the detector from a current to a voltage; first generating means for generating a track error signal through a low pass filter from the amplifying means; second generating means for generating a track addition signal through the low pass filter from the amplifying means; third generating means for adding the signal from the amplifying means including a high frequency area, first outputting means for outputting a track detect signal wherein a high frequency signal is removed from the track error signal using the track error signal from the first generating means and the track addition signal from the second generating means; first binarizing means for producing a track pulse signal from the first outputting means; second outputting means for outputting the track addition pulse signal obtained by binarizing the track addition signal from the second generating means by a predetermined value between a positive peak of a signal having no high speed data signal and a negative peak, and outputting a data detect signal obtained by binarizing a differential signal obtained by an envelope signal, the envelope signal being generated by the third generating means through a high pass filter; second binarizing means for masking the track addition pulse signal with the data detect signal from the second outputting means, and outputting a groove land signal; and third outputting means for detecting a central position of the groove, a central position of the land, a groove-land changing position, and a land-groove changing position of the track pulse signal from the first binarizing means and the groove-land signal from the second binarizing means, and outputting a direction signal in the order of detection.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

A first embodiment of the present invention will now be explained with reference to the drawings.

Figure 1:
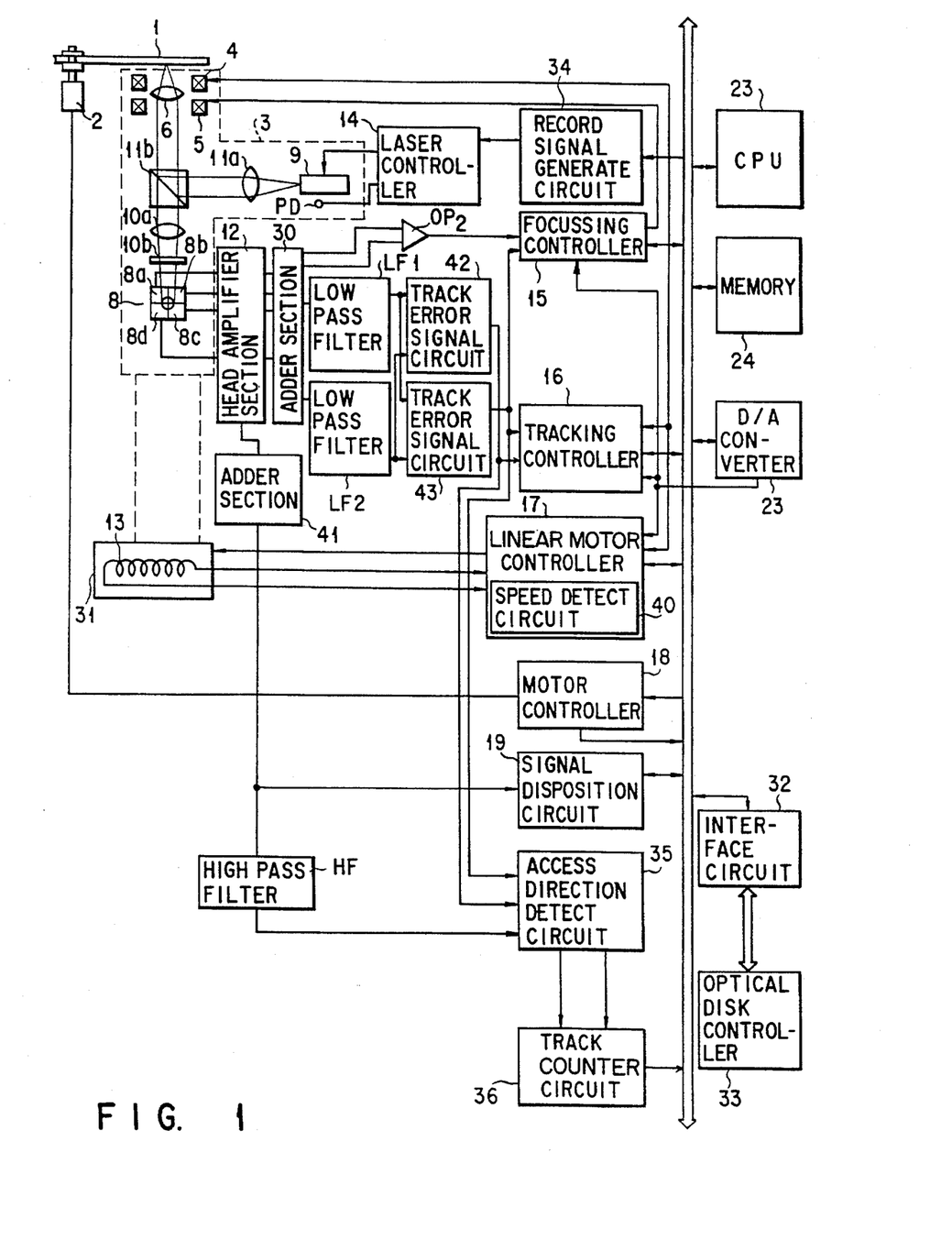
FIG. 1 is a block diagram showing a circuit structure of an optical disk apparatus of one embodiment of the present invention.
Figure 2:
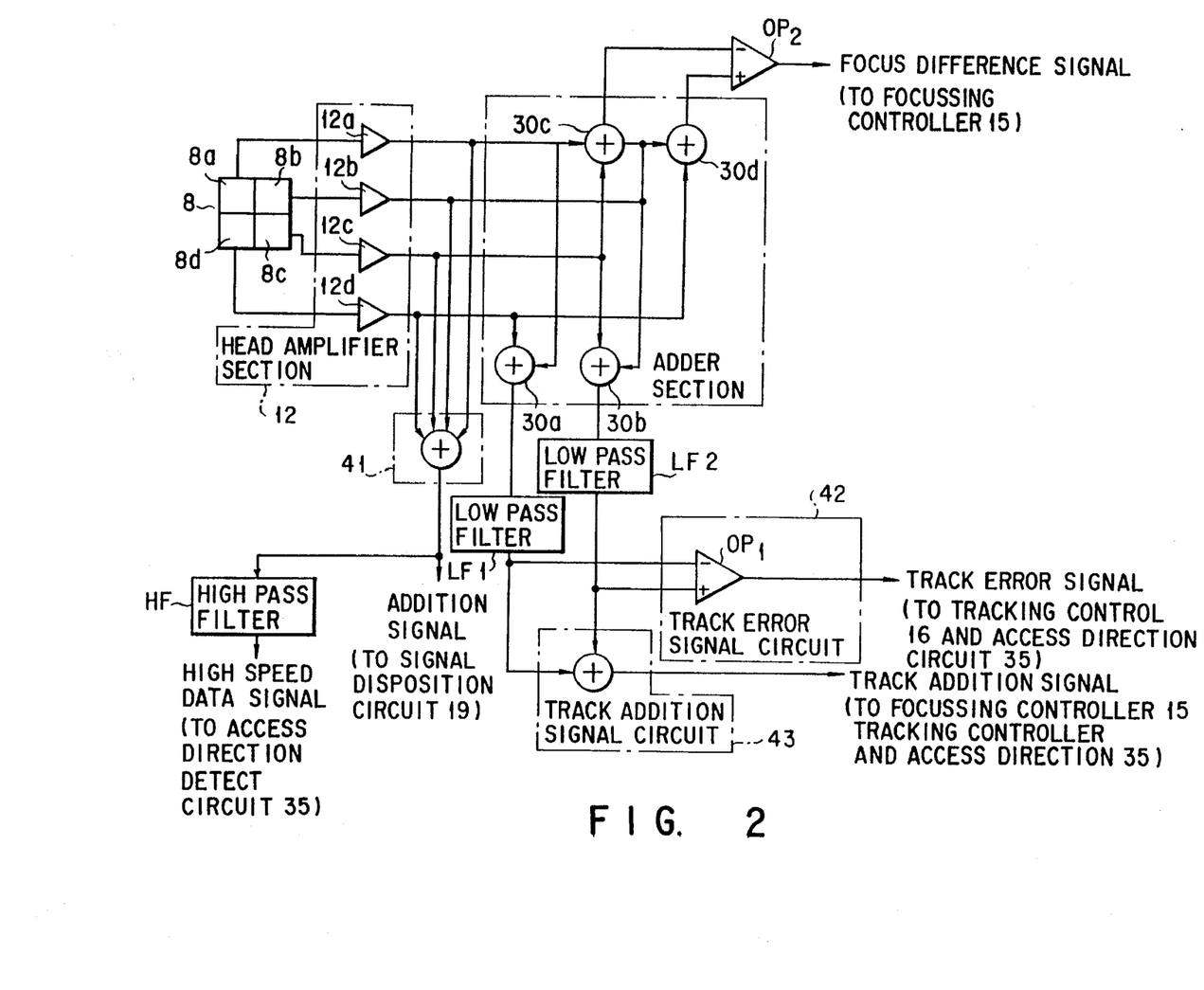
FIG. 2 is a view explaining an optical detector, a head amplifier section, and an adder section.
Figure 3:
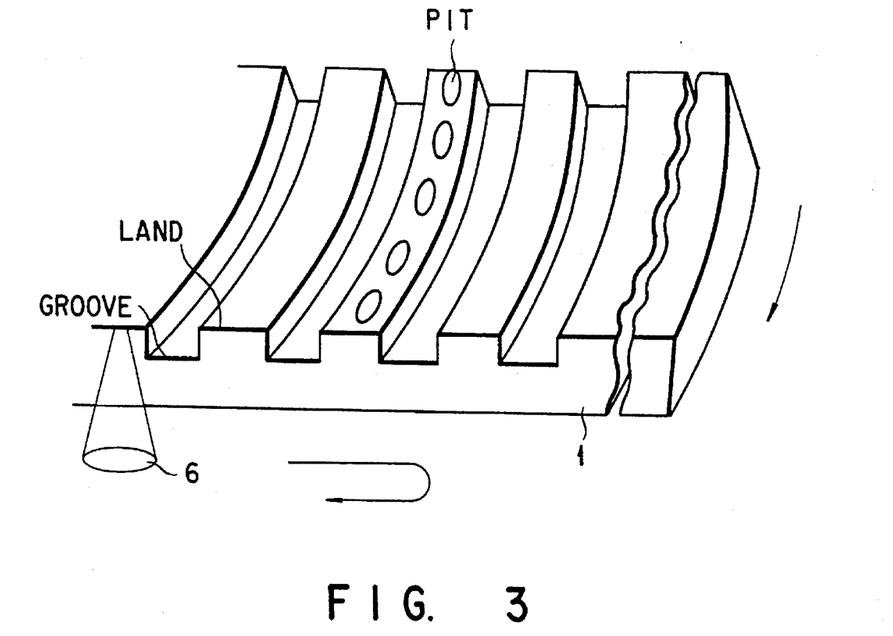
FIG. 3 is a perspective view explaining the structure of the optical disk.
Figure 4:
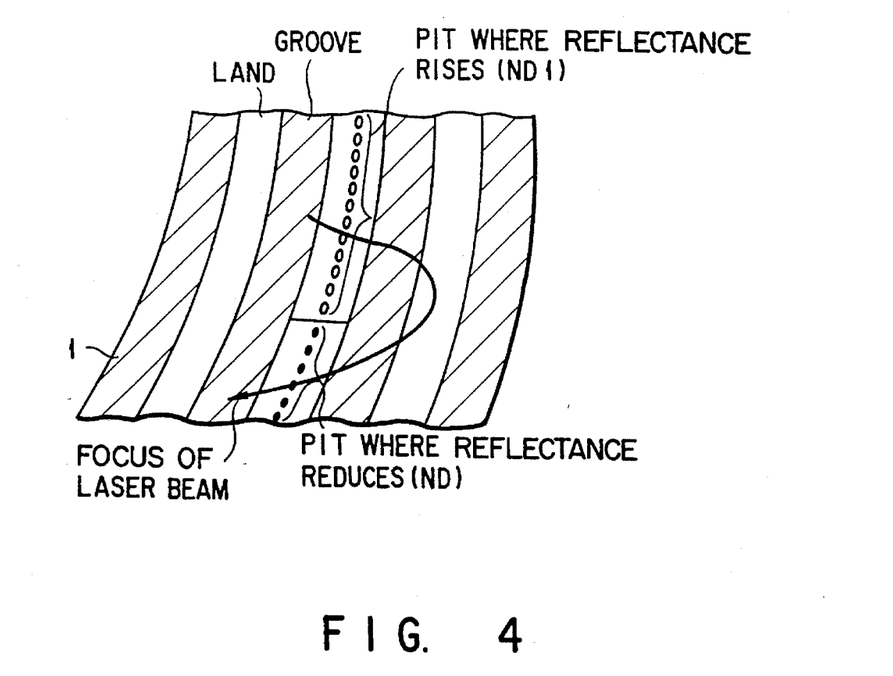
FIG. 4 is a plane view explaining the structure of the optical disk.

FIGS. 1 and 2 show an optical disk apparatus having a detecting apparatus for detecting a moving direction of an optical head. More specifically, as shown in FIGS. 3 and 4, a groove and a land (recording track) are spirally or concentrically formed on a surface of an optical disk 1. The optical disk 1 is rotated at a constant speed by a motor 2. The motor 2 is controlled by a motor controller 18.

In the land of the optical disk 1, there is provided a header portion having a pre-pit which is formatted in advance, and a pit continuous to the head portion is formed, thereby recording data.

The recording of data to the optical disk 1 or the reproduction of data is performed by an optical head provided at a lower portion of the optical disk 1.

In the optical disk 1, though there is used a recording film in which a pit is formed by aperture, a recording film using a phase change or a multilayer recording film may be used. Also, an optical magnetic disk may be used as an optical disk. Similarly, in the above case, the structure of the optical head is changed.

In the optical head 3, an objective lens 6 is held by a wire (not shown) or a plate spring. The objective lens 6 is moved to a focusing direction (the same direction as an optical axis of the objective lens 6) by a driving coil 5, and also movable in a tracking direction (the direction perpendicular to the light axis of the objective lens 6) by a driving coil 4.

The optical disk 1 is irradiated with a laser beam (light beam), which is generated by a semiconductor laser generator 9 driven by a laser controller 14, through a collimator lens 11a, a half-prism 11b, and the objective lens 6. Then, a light beam reflected from the optical disk 1 is guided to an optical detector 8 through the objective lens 6, a half-prism 11b, a condenser lens 10a, and a cylindrical lens 10b.

The photodetector 8 comprises four-divided optical detection cells 8a, 8b, 8c, and 8d.

An output signal of the optical detection cell 8a of the photodetector 8 is supplied to one end of each of adders 30a and 30c through an amplifier 12a, and an output signal of the optical detection cell 8b is supplied to one end of each of adders 30b and 30d through an amplifier 12b. Moreover, an output signal of the optical detection cell 8c is supplied to the other end of each of adders 30b and 30c through the amplifier 12c, and an output signal of the optical detection cell 8d is supplied to the other end of each of adders 30a and 30d through an amplifier 12d.

As shown in FIG. 2, a head amplifier section 12 comprises the amplifiers 12a, . . . 12d, and an adder section 30 comprises the adders 30a, 30b, 30c, and 30d.

The output signals of the optical detection cells 8a, 8b, 8c, and 8d of the optical detector 8 are supplied to a high speed adder 41 through the amplifiers 12a, 12b, 12c, and 12d, respectively. The change of a reflectance from the pit (record data) formed on the track appears on an output from the high speed adder 41 (see FIG. 6E). The signal is supplied to a signal disposition circuit 19, and also supplied to an access direction detect circuit 35 through a high pass filter HF.

Figure 5A:
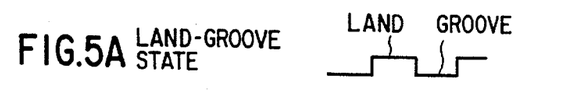
FIG. 5A is a view showing that there are provided a groove and a land on the optical disk.
Figure 5B:
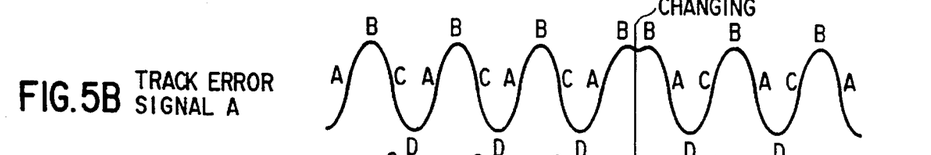
FIG. 5B is a view showing a track error signal.
Figure 6A:
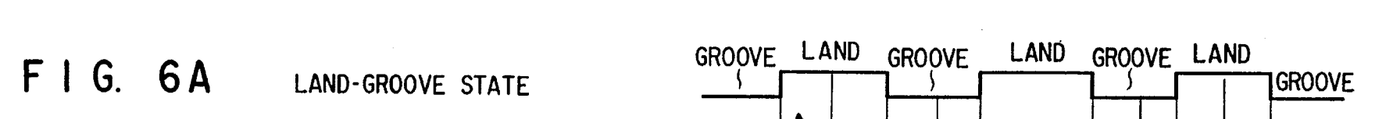
FIG. 6A is a view showing a gap on the optical disk and a land state.
Figure 6B:
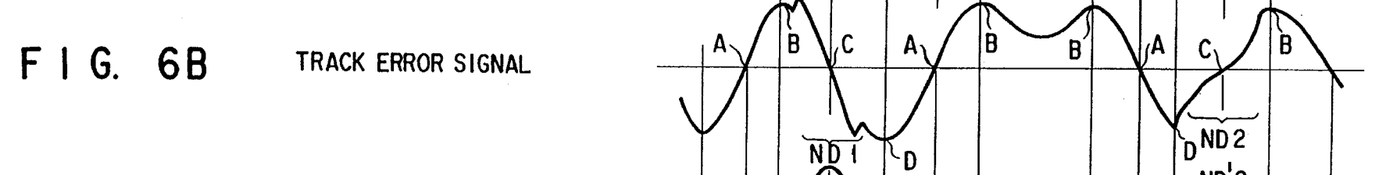
FIG. 6B is a view showing a track error signal.

An output of the adder 30a is supplied to a reverse input terminal of a differential amplifier OP1, which constitutes a track error signal circuit 42, through a low pass filter LF1. An output of the adder 30b is supplied to a non-inverted input terminal of the differential amplifier OP1 through a low pass filter LF2. Thereby, as shown in FIGS. 5B and 6B, the differential amplifier OP1 outputs a track error signal (push-pull signal) corresponding to the land and groove shown in FIGS. 5A and 6A in accordance with a signal difference between low frequencies between the adders 30a and 30b.

The track error signal from the differential amplifier OP1 is supplied to a tracking controller 16 and the access direction detect circuit 35.

The outputs of the adders 30a and 30b are supplied to a track addition signal circuit 43, which comprises adders, through the low pass filters LF1 and LF2, respectively. Thereby, as shown in FIGS. 5C and 6C, the track addition signal circuit 43 outputs a track addition signal corresponding to the land and groove shown in FIGS. 5A and 6A in accordance with the sum of the low frequencies of the adders 30a and 30b.

The track addition signal from the track addition signal circuit 43 is supplied to a focusing controller 15, the tracking controller 16, and the access direction detect circuit 35. The track addition signal output from the track addition signal circuit 43 is formed to have a waveform including a difference in the reflectance of the surface of the optical disk 1 and diffraction at the time when the laser beam crosses the groove and the land.

Figure 5C:
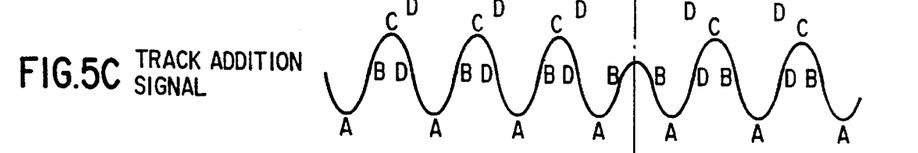
FIG. 5C is a view showing a track addition signal.
Figure 6C:
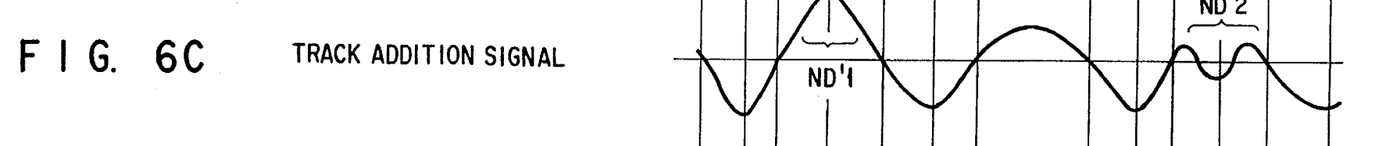
FIG. 6C is a view showing a track addition signal.

The relationship between the track error signal and the track addition signal can be explained as follows:

As shown in FIGS. 5B and 5C, a central position of the groove is shown by a signal A (groove position signal) when the track error signal is located at the center of the amplitude and the the track addition signal is located at a lower position than the center of the amplitude. A position changing from the groove to the land is shown by a signal B (first changing position signal; groove-land changing signal), serving as a signal showing a positive peak position of the track error signal, when the track addition signal is located at the center of the amplitude and the track error signal is located at a higher position than the center of the amplitude. A central position of the land is shown by a signal C (land position signal) when the track addition signal is located at the center of the amplitude and the the track error signal is located at a higher position than the center of the amplitude. A position changing from the groove to the land is shown by a signal D (second changing position signal; groove-land changing signal), serving as a signal showing a negative peak position of the track error signal, when the track addition signal is located at the center of the amplitude and the track error signal is located at a lower position than the center of the amplitude.

There are two moving directions of the optical head with respect to the disk, that is, signal A→signal B→signal C→signal D→signal A, . . . (corresponding to the left side from one-dot chain line of FIGS. 5B to 5R), and signal D→signal C→signal B→signal A→signal D, . . . (corresponding to the right side from one-dot chain line of FIGS. 5B to 5R). For example, an access direction, that is, the moving direction of the optical head 3 is detected by the access direction detect circuit 35 to be described later, depending on whether the signal B follows the signal A or the signal D follows the signal A.

The tracking controller 16 generates a track driving signal in accordance with the track error signal supplied from the differential amplifier OP1 and the track addition signal supplied from the track addition signal circuit 43.

The track driving signal output from the tracking controller 16 is supplied to the driving coil 4 of the tracking direction. Also, the track driving signal used in the tracking controller 16 is supplied to a linear motor controller 17.

Figure 5D:
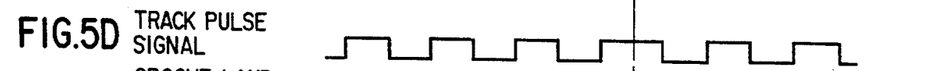
FIG. 5D is a view showing a track detection signal.
Figure 5E:
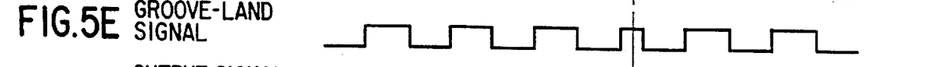
FIG. 5E is a view showing groove-land signals.
Figure 5F:
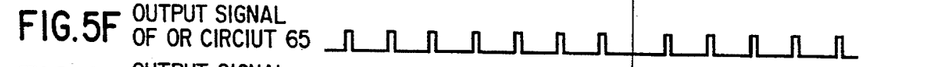
FIG. 5F is a view showing an output signal of an OR circuit 65.
Figures 5G, 5H:
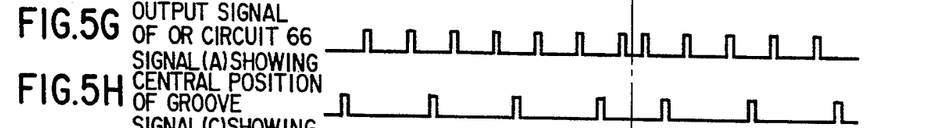
FIG. 5G is a view showing an output signal of an OR circuit 66.
FIG. 5H is a view showing a signal A showing a central position of the groove.
Figures 5I, 5J:
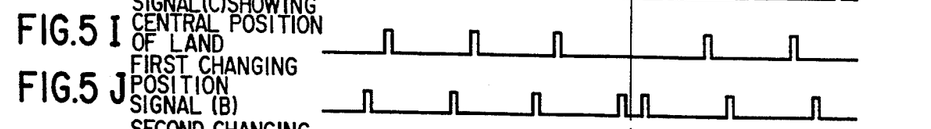
FIG. 5I is a view showing a signal C showing a central position of the land.
FIG. 5J is a view showing a first changing position signal B.
Figure 5K:
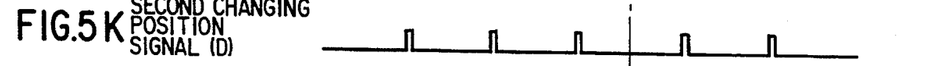
FIG. 5K is a view showing a second changing position signal B.
Figure 5L:
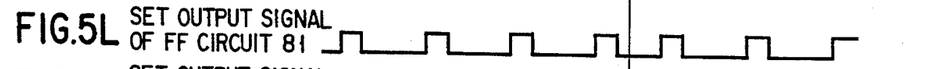
FIG. 5L is a view showing a set output signal of an FF circuit 81.
Figure 5M:
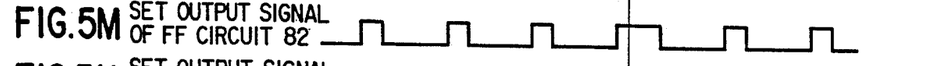
FIG. 5M is a view showing a set output signal of an FF circuit 82.
Figure 5N:
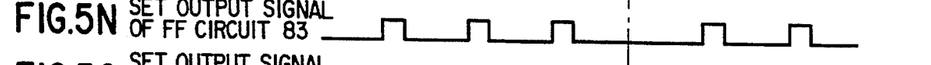
FIG. 5N is a view showing a set output signal of an FF circuit 83.
Figures 5O, 5P:
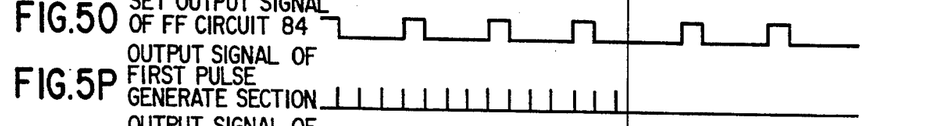
FIG. 5O is a view showing a set output signal of an FF circuit 84.
FIG. 5P is a view showing an output signal of a first pulse generating section.
Figures 5Q, 5R:
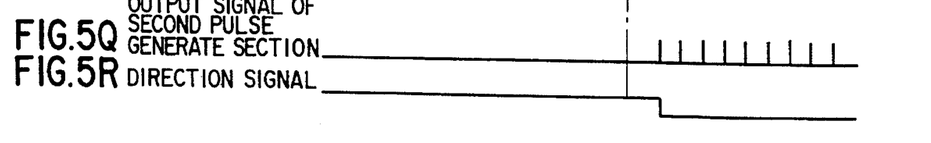
FIG. 5Q is a view showing an output signal of a second pulse generating section.
FIG. 5R is a view showing a direction signal.
Figure 6D:
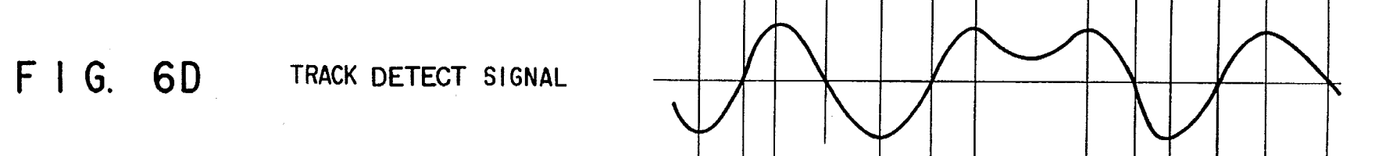
FIG. 6D is a view showing a track detection signal.
Figures 6E, 6F:
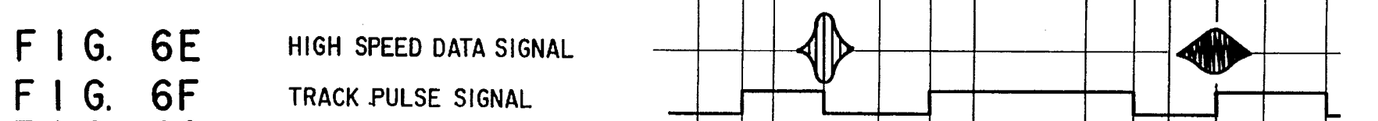
FIG. 6E is a view showing a high speed signal.
FIG. 6F is a view showing a track pulse signal.
Figures 6G, 6H, 6I, 6J:
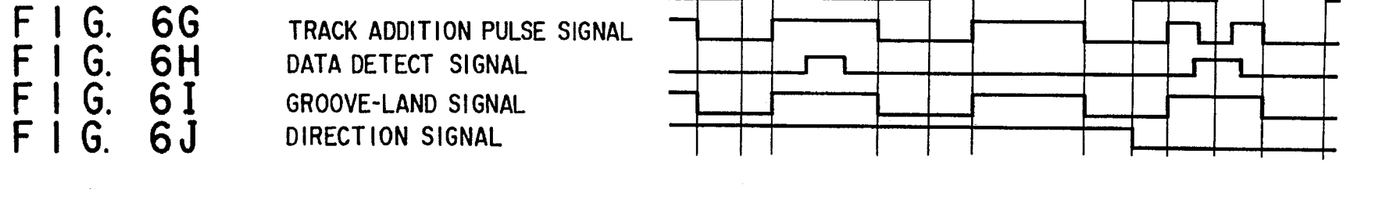
FIG. 6G is a view showing a track addition pulse signal.
FIG. 6H is a view showing a data detection signal.
FIG. 6I is a view showing groove-land signals.
FIG. 6J is a view showing a direction signal.

The access direction detect circuit 35 detects the moving direction of the optical head 3, serving as an access direction on the optical disk 1, which is irradiated with the beam light through the objective lens 6, and outputs a direction signal as shown in FIGS. 5R and 6J in accordance with the track error signal supplied from the differential amplifier OP1, the track addition signal supplied from the track addition signal circuit 43, and a high speed data signal supplied from the high pass filter HF. Then, a track pulse signal, corresponding to the groove-land changing position, is output from the access direction detect circuit 35 as shown in FIGS. 5D and 6F.

The direction signal and the track pulse signal output from the access direction detect circuit 35 are supplied to a track counter circuit 36. The track counter circuit 36 counts the track position on the optical disk 1, which is irradiated with the light beam through the objective lens 6, in accordance with the direction signal and the track pulse signal output from the access direction detect circuit 35. For example, in a case that the direction signal is set to a high level, the track counter circuit 36 counts up every time the track pulse signal is supplied. In a case that the direction signal is set to a low level, the counter circuit 36 counts down every time the track pulse signal is supplied. A count value (corresponding to the track position) counted by the track counter circuit 36 is output to a CPU 23.

The linear motor controller 17 flows current, which corresponds to a moving speed, to a driving coil (conductor member) 13 of a linear motor 31 to be described later in accordance with the track driving signal sent from the tracking controller 16 and a moving control signal sent from the CPU 23.

In the linear motor controller 17, there is provided a speed detect circuit 40 for detecting a relative speed between the driving coil and a coil for a magnetic member (not shown), that is, the moving speed of the optical head 3 (relative speed between the beam light and the optical disk 1) due to the linear motor 31 by use of an electric change of a speed detection coil (not shown), which occurs the moment a driving coil 13a of the linear motor 31 crosses a magnetic flux generated by a magnetic member (not shown).

An output signal of the adder 30c is supplied to an inverted input terminal of a differential amplifier OP2, and an output signal of the adder 30d is supplied to a non-inverted input terminal of the differential amplifier OP2. Thereby, the differential amplifier OP2 supplies a signal of a focus point to the focusing controller 15 in accordance with the difference between the adders 30c and 30d. An output signal of the focusing controller 15 is supplied to the focusing drive coil 5 so as to control the laser beam to be a just focused state on the optical disk 1.

The addition signal of the output of each of the optical detection cells 8a to 8d in a state that the focusing and tracking are performed as mentioned above, i.e., the output, which is sent from the high speed adder 41 (signal including the change of the reflectance from the pit (record data) formed on the track, see FIG. 6E), is supplied to the signal disposition circuit 19. Then, the signal disposition circuit 19 regenerates record data, address data (track number, sector number, etc).

The reproduce signal (reproduce data) reproduced by the signal disposition circuit 19 is output to an optical disk controller 33, serving as an outer apparatus, through an interface.

In a first stage of the laser controller 14, there is provided a record signal generate circuit 34, serving as a modulating circuit for modulating the record signal.

In the optical disk apparatus, there are provided the focusing controller 15, the tracking controller 16, and a D/A converter 22, which is used to transmit/receive data between the linear motor controller 17 and the CPU 23.

The tracking controller 16 moves the objective lens 6 in accordance with a track jump signal supplied from the CPU 23 through the D/A converter 22 so as to move the light beam for one track.

The laser controller 14, the focusing controller 15, the tracking controller 16, the linear motor controller 17, the motor controller 18, the signal disposition circuit 19, the record signal generate circuit 34, and the track counter circuit 36 are controlled by the CPU 23 through a bus line 20. The CPU 23 performs a predetermined operation by a program stored in a memory 24.

Figure 7:
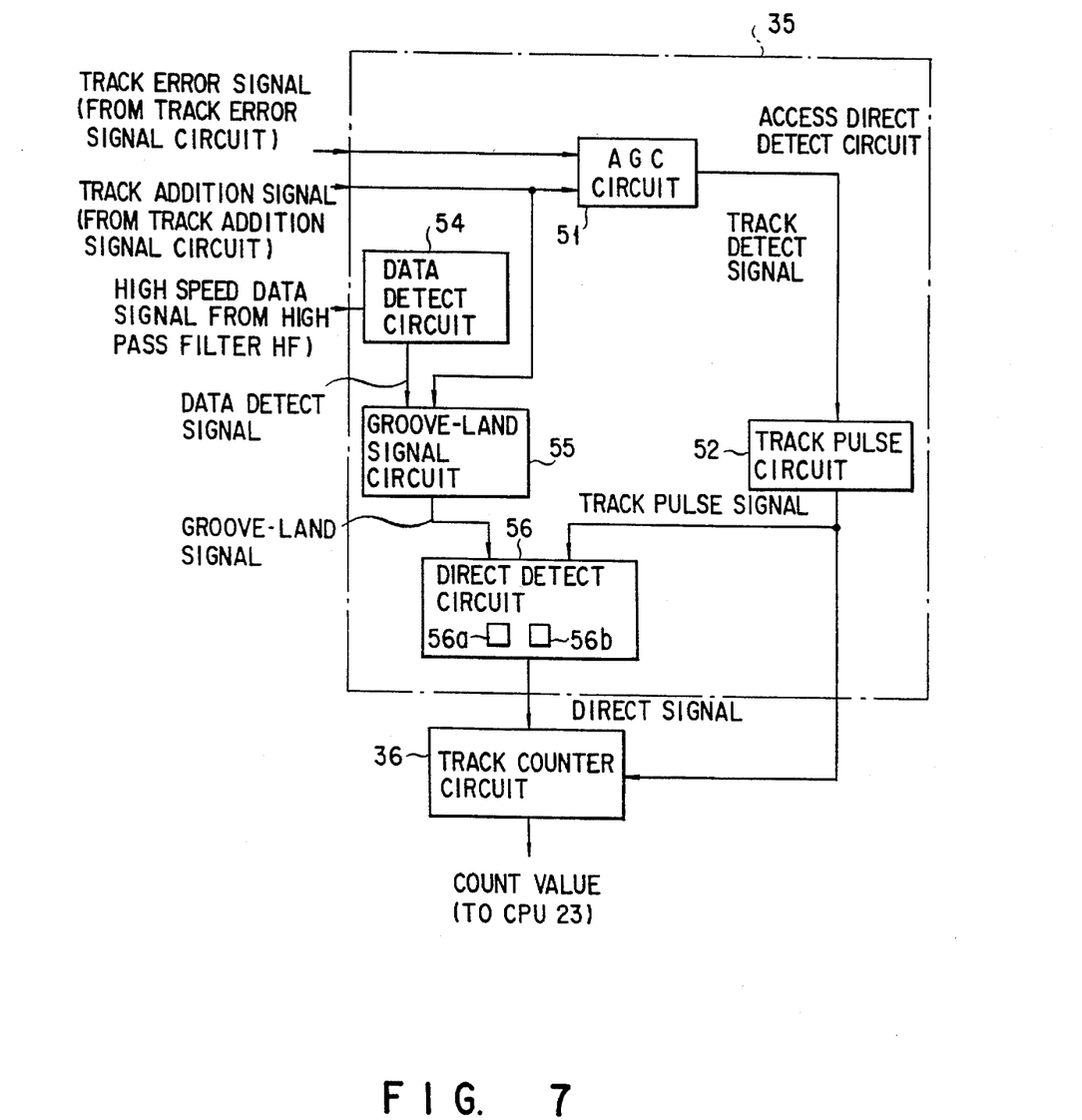
FIG. 7 is a block diagram showing a circuit diagram of an access direction detecting circuit.

The access direction detect circuit 35 comprises an AGC (auto gain control) circuit 51, a track pulse circuit 52, a data detect circuit 54, a groove-land signal circuit 55, and a direction detect circuit 56 as shown in FIG. 7.

The AGC circuit 51 outputs a track detect signal in which a noise signal, which is generated by a pit, convex-concave portions, dust, dirt, a flaw, and the like, formed in the track, is removed from the track error signal by use of the track error signal supplied from the track error circuit 42 and the track addition signal from the track addition circuit 43. In this case, the noise of the high speed signal incoming with the track error signal is removed by dividing the track addition signal to a denominator.

In other words, as shown in FIG. 6B, noise signals ND1, ND2, which are generated by a pit, convex-concave portions, dust, dirt, a flaw, and the like, formed in the track, are superimposed on the track error signal. The noise signal ND1 is a signal appearing at a portion having a low reflectance and convex-concave portions, and the noise signal ND2 is a signal appearing at a portion having a high reflectance.

Moreover, as shown in FIG. 6C, noise signals ND'1 and ND'2 are superimposed on the track addition signal in synchronous with the noise signals ND1 and ND2.

For example, as shown in FIG. 4, the noise signal ND1 passes through the track portion, which is formed by the pit (record data) where the reflectance rises, from the left land, and moves to the right land. The noise signal ND2 passes through the track portion, which is formed by the pit (record data) where the reflectance lowers, and pre-formatted, from the right land, and moves to the left land.

Thereby, the AGC circuit 51 controls an amplification factor (gain) of an amplifier (not shown) for amplifying the track error signal supplied from the track error signal circuit 42 in accordance with the signal level of the track addition signal sent from the track addition signal circuit 43. Thereby, as shown in FIG. 6D, a track detect signal where a noise signal is removed is output. As a result, the positive peak value corresponding to each track and the negative peak value are corrected to be substantially constant, and output.

The track detect signal sent from the AGC circuit 51 is output to a track pulse circuit 52.

Figure 8:
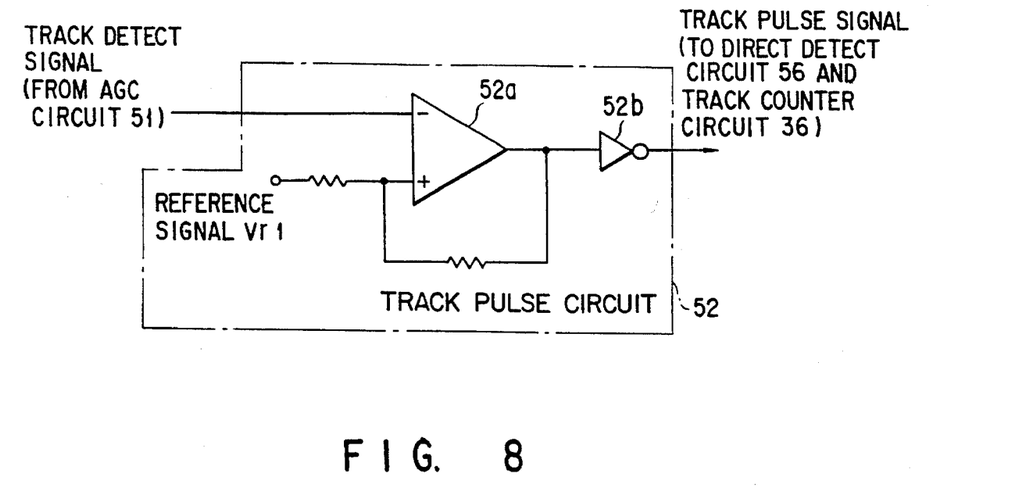
FIG. 8 is a view showing a circuit structure of a track pulse circuit.

As shown in FIG. 8, the track pulse circuit 52 comprises a comparator 52a and an inverter circuit 52b. By use of the track pulse circuit 52, the track detect signal supplied from the AGC circuit 51 is compared with a reference signal Vr1, which approximates to a zero level, in binary. Then, a track pulse signal for detecting timing, which passes through the central position of the groove and that of the land (FIGS. 5D and 6F), is output. The track pulse signal, which is output from the track pulse circuit 52, is outputted to the direction detect circuit 56 and the track counter circuit 36.

Figure 9:
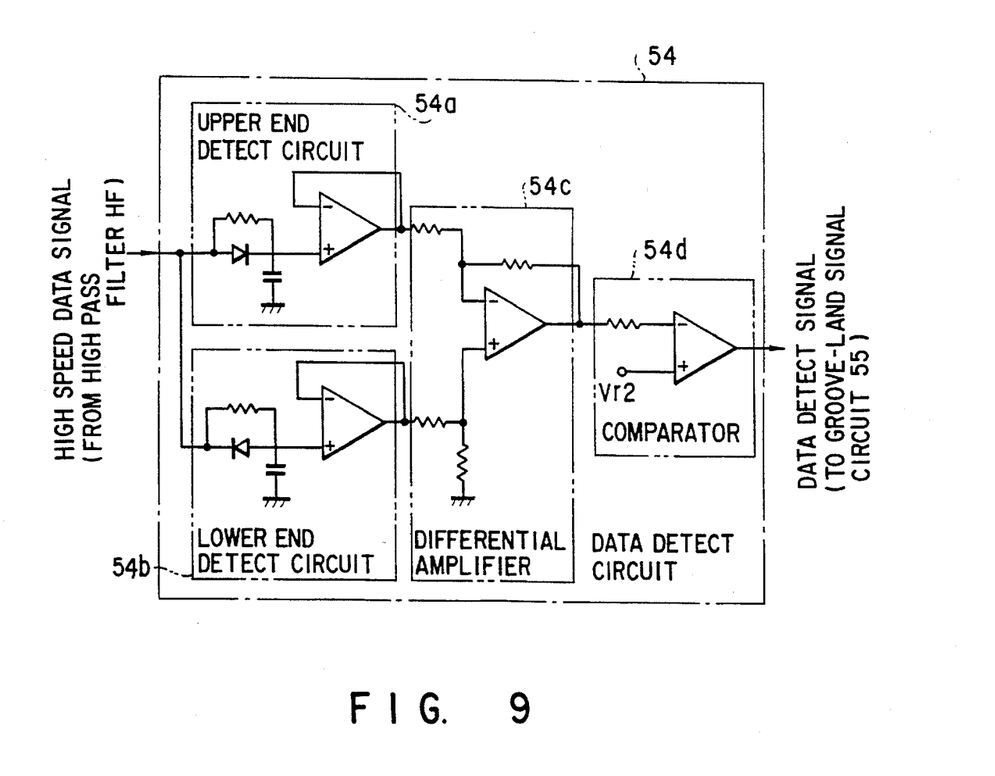
FIG. 9 is a view showing a circuit structure of a data detection circuit.

As shown in FIG. 9, the data detect circuit 54 comprises an upper end detect circuit 54a having an integration circuit, a diode, and an operational amplifier, a lower end detect circuit 54b having an integration circuit, a diode and an operational amplifier, a differential amplifier 54c having an operational amplifier, and a comparator 54d.

The upper end detect circuit 54a detects an upper end of the high speed signal from the high pass filter HF. The lower end detect circuit 54b detects an lower end of the high speed signal from the high pass filter HF. The differential amplifier 54c outputs a differential signal between an upper end detect signal from the upper end detect circuit 54a and a lower end detect signal from the lower end detect circuit 54b. The comparator 54d compares the differential signal output from the differential amplifier 54c with a predetermined value (reference signal Vr2). Then, if the differential signal is more than the predetermined value, the differential signal is discriminated as a portion having data, and a corresponding signal (data detect signal) is output.

Only the high speed data signal (as shown in FIG. 6E) of the addition value from the high speed adder 41 is supplied through the high pass filter HF, whereby the data detect circuit 54 performs envelop detections of the upper and lower ends of the high speed signal. Then, if the difference between the envelop detections exceeds a predetermined voltage, the data detect circuit 54 outputs a data detect signal as shown in FIG. 6H. The data detect signal from the data detect circuit 54 is outputted to the groove-land signal circuit 55.

Figures 10, 11:
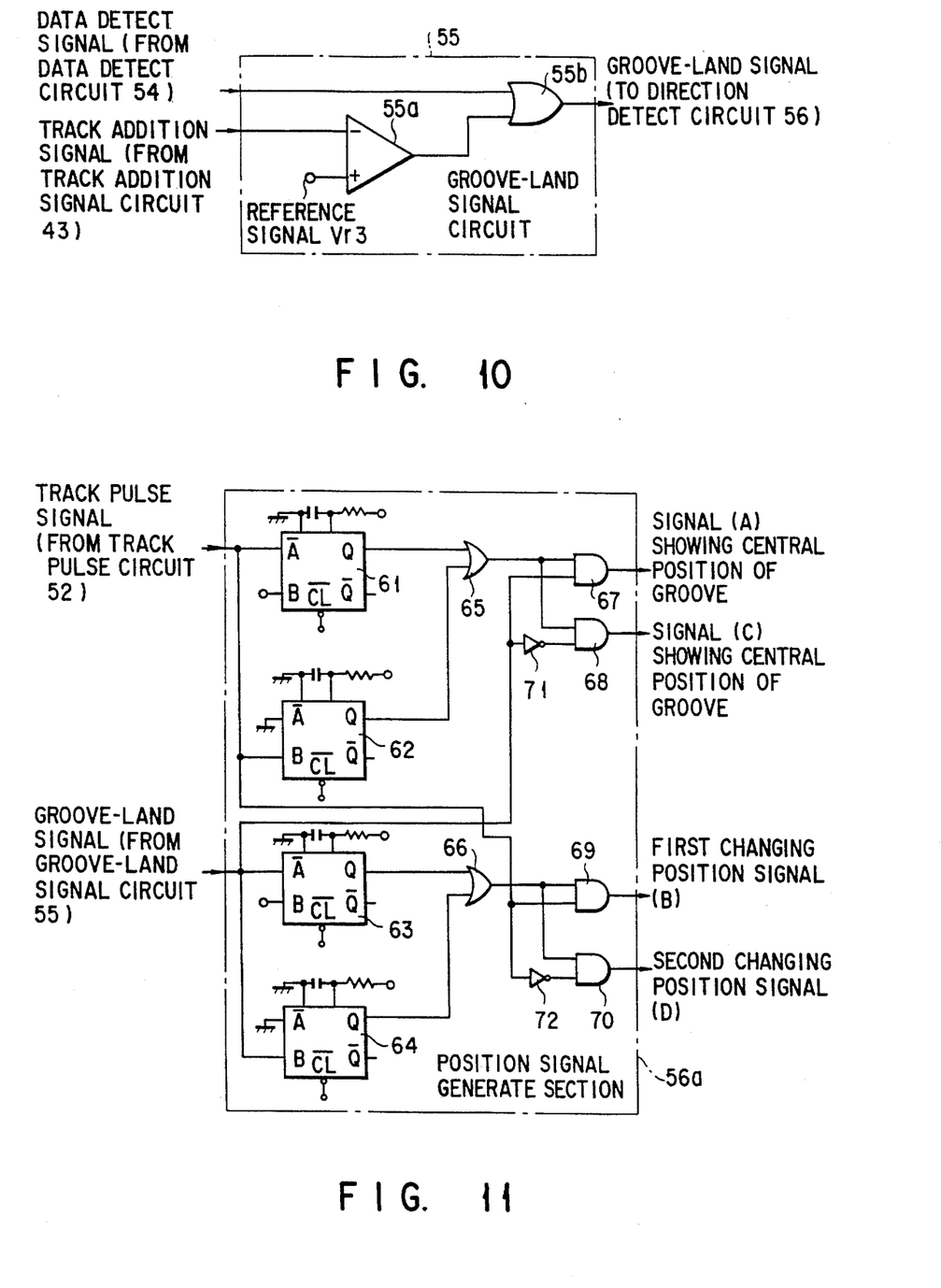
FIG. 10 is a view showing a circuit structure of the gap land signals.
FIG. 11 is a view showing a circuit structure of a position signal generating section of a direction detecting circuit.

The groove-land signal circuit 55 comprises a comparator 55a, and an OR circuit 55b as shown in FIG. 10.

The groove-land signal circuit 55 obtains the track addition pulse signal in which noise of the track addition signal is removed from the track addition signal circuit 43 by the comparator 55a based on a reference signal Vr3 (FIG. 6G). Then, the track addition pulse signal and the data detect signal supplied from the data detect circuit 54 are ORed, thereby correcting the portion where the reflectance is reduced so as to remove the noise signal generated by influence of ND'2 shown in FIG. 6C. Then, a groove-land signal, serving as a correct signal, is output to the land-groove changing position (the changing position from the land to the groove or the changing position from the groove to the land) as shown in FIGS. 5E and 6I. The comparator 55a compares the track addition signal with the reference signal Vr3 at the center of the track addition signal in which signals such as a pit, convex-concave portions are removed, so as to make the signal binary.

The direction detect circuit 56 classifies the signals to signals A to D showing four positions, that is, the first changing position signal B appearing when the edge of the groove-land signal is incoming in a case when the track pulse signal is in a high level, the second changing position signal D appearing when the edge of the groove-land signal is incoming in a case when the track pulse signal is in a low level level, the land position signal C, which shows the central position of the land, appearing when the edge of the the track pulse signal is incoming when the groove-land signal is in a high level, and the groove position signal A, which shows the central position of the groove, appearing when the edge of the the track pulse signal is incoming when the groove-land signal is in a low level. The direction detect circuit 56 detects the access direction, i.e., the moving direction of the optical head 3, in order of incoming the signals A to D showing the four positions, and outputs the direction signal shown in FIGS. 5R and 6J. The direction signal from the direction detect circuit 56 is output to the track counter circuit 36.

Figure 12:
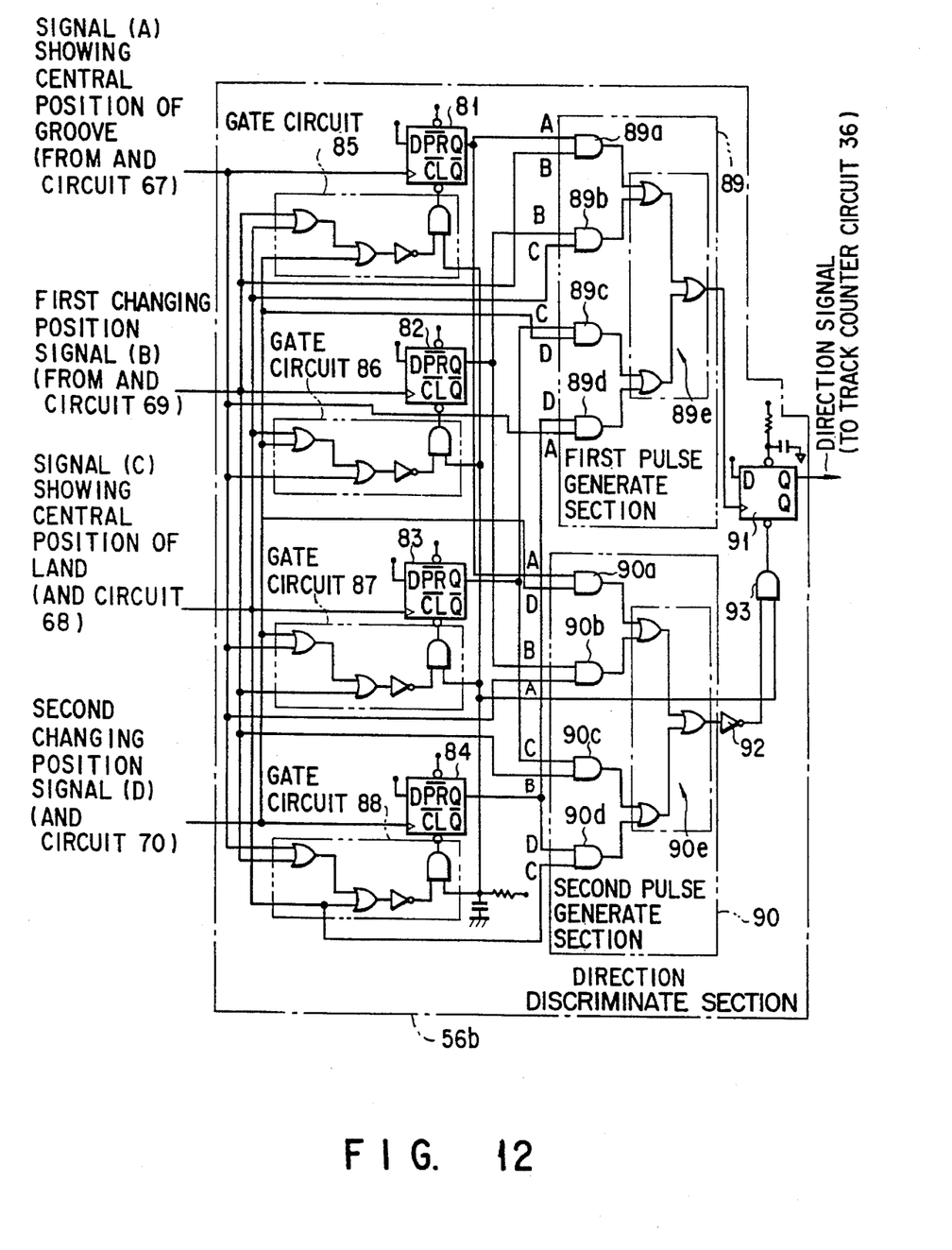
FIG. 12 is a view showing a circuit structure of a direction discriminating section of the direction detecting circuit.

The direction detect circuit 56 comprises a position signal generate section 56a and a direction discriminate section 56b as shown in FIGS. 7, 11 and 12.

The position generate section 56a generates the groove position signal A showing the central position of the groove, the land position signal C showing the the central position of the land, the first changing position signal B, and the second changing position signal D in accordance with the track pulse signal from the track pulse circuit 52, and the groove-land signal from the groove-land signal circuit 55.

The generated groove position signal A, land position signal C, first changing position signal B, and second changing position signal D are supplied to the direction discriminate section 56b.

The direction discriminate section 56b detects the moving direction (access direction) of the optical head 3 to the optical disk 1 in accordance with the order of the generation of these supplied groove position signal A, land position signal C, first changing position signal B, and second changing position signal D.

As shown in FIG. 11, the position signal generate section 56a comprises four monostable multivibrators (monomulti) 61, 62, 63, 64, OR circuits 65 and 66, AND circuits 67, 68, 69, and 70, and inverter circuits 71, and 72.

The monostable multivibrator 61 outputs a short pulse having a constant width when the track pulse signal rises from the track pulse circuit 52. The monostable multivibrator 62 outputs a short pulse having a constant width when the track pulse signal falls from the track pulse circuit 52. Each output of the monostable multivibrators 61 and 62 is supplied to one end of each of the AND circuits 67 and 68 through the OR circuit 65. The groove-land signal is supplied to the other end of the AND circuit 67 from the groove-land signal circuit 55. The groove-land signal sent from the groove-land signal circuit 55 is inverted by the inverter 71, and supplied to the other end of the AND circuit 68. The OR circuit 65 outputs the pulse shown in FIG. 5F at the time of rising and falling the track pulse signal shown in FIG. 5D.

The AND circuit 67 ANDs the outputs of each output of the monostable multivibrators 61 and 62 and the groove-land signal from the groove-land signal circuit 55. Thereby, as shown in FIG. 5H, when the track error signal is located at the center of the amplitude and the track addition signal is located at an upper position than the center of the amplitude, the groove position signal A showing the central position of the groove is outputted. Also, the AND circuit 68 ANDs the outputs of each output of the monostable multivibrators 61 and 62 and the reversed groove-land signal from the groove-land signal circuit 55. Thereby, as shown in FIG. 5I, when the track error signal is located at the center of the amplitude and the the track addition signal is located at a lower position than the center of the amplitude, the land position signal C showing the central position of the land is outputted.

The monostable multivibrator 63 outputs a short pulse having a constant width when the groove-land signal rises from the groove-land circuit 55. The monostable multivibrator 64 outputs a short pulse having a constant width when the groove-land signal falls from the groove-land circuit 55. Each output of the monostable multivibrators 63 and 64 is supplied to one each of the AND circuits 69 and 70 through the OR circuit 66. The track pulse signal is supplied to the other end of the AND circuit 69 from the track pulse circuit 52. The track pulse sent from the track pulse circuit 52 is inverted by the inverter 72, and supplied to the other end of the AND circuit 70. The OR circuit 66 outputs the pulse shown in FIG. 5G at the time of rising and falling the groove-land signal shown in FIG. 5E.

The AND circuit 69 ANDs the outputs of each output of the monostable multivibrators 63 and 64 and the track pulse signal from the track pulse signal circuit 52. Thereby, as shown in FIG. 5J, when the track addition signal is located at the center of the amplitude and the the track error signal is located at an upper position than the center of the amplitude, the first changing position signal B is output. Also, the AND circuit 70 ANDs the outputs of each output of the monostable multivibrators 63 and 64 and the inverted track pulse signal from the track pulse circuit 52. Thereby, as shown in FIG. 5K, when the track addition signal is located at the center of the amplitude and the the track error signal is located at a lower position than the center of the amplitude, the second changing position signal D is output.

Each of signals A to D output from the AND circuits 67, 69, 68, and 70 is supplied to the direction discriminate section 56b.

As shown in FIG. 12, the direction discriminate section 56b comprises four D-type flip-flops (FF circuits) 81, 82, 83, and 84, gate circuits 85, 86, 87, 88, first and second pulse generate sections 89, and 90, a D-type flip-flop (FF circuit) 91, an inverter circuit 92, and an AND circuit 93.

The groove position signal A, the first changing position signal B, the land position signal C, and the second changing position signal D, which are respectively sent from the AND circuits 67, 69, 68, and 70, are supplied to a clock input terminal of each of the FF circuits 81, 82, 83, and 84. Signals other than the signals each supplied to the corresponding clock input terminal are supplied to a clear input terminal of each of the FF circuits 81, 82, 83, and 84 through the gate circuits 85, 86, 87, and 88.

For example, the signals (B, C, D) are supplied to the FF circuit 81 from the AND circuits 69, 68, and 70 through the gate circuit 85. The signals (A, C, D) are supplied to the FF circuit 82 from the AND circuits 67, 68, and 70 through the gate circuit 86. The signals (A, B, D) are supplied to the FF circuit 83 from the AND circuits 67, 69, and 70 through the gate circuit 87. The signals (A, B, C) are supplied to the FF circuit 84 from the AND circuits 67, 69, and 68 through the gate circuit 88.

The data input terminal of each of the FF circuits 81, 82, 83, and 84 are set to a high level.

Each of the gate circuits 85, 86, 87, and 88 comprises an OR gate and an inverter circuit and an AND circuit.

As shown in FIG. 5L, the FF circuit 81 is set based on the groove position signal A sent from the AND circuit 67, and reset by the other signals (B, C, D). As shown in FIG. 5M, the FF circuit 82 is set based on the first changing position signal B sent from the AND circuit 68, and reset by the other signals (B, C, D). As shown in FIG. 5N, the FF circuit 83 is set based on the land position signal C sent from the AND circuit 69, and reset by the other signals (A, B, D). As shown in FIG. 5O, the FF circuit 84 is set based on the second changing position signal D sent from the AND circuit 70, and reset by the other signals (A, B, C).

In the FF circuits 81 to 84, the above-structured gate circuits 85 to 88 are respectively provided at each of the clear input terminals. Due to this, for example, the FF circuit 81 is cleared by a clear signal generated by the signals B to D, so that set time becomes longer than the interval of the corresponding set signal A because the signal A is generated by the gate circuit.

A set output of each of the FF circuits 81 to 84 is supplied to the first and second pulse generate sections 89 and 90. Also, each of signals A to D sent from the AND circuits 67, 69, 68, and 70 is supplied to the first and second pulse generate sections 89 and 90.

By ANDing the groove position signal A, the first changing position signal B, the land position signal C, and the second changing position signal D, which are respectively sent from the AND circuits 67, 69, 68, and 70, the first pulse generate section 89 outputs the pulse shown in FIG. 5P when the radiation position of the laser beam of the optical head 3 is moved on the optical disk 1 in a forward direction, that is, "signal A→signal B→signal C→signal D→signal A, . . ." and a forward direction. This shows the case shown in the left side from broken line (direction changing position) of FIGS. 5B to 5R.

The first pulse generate section 89 comprises four AND circuits 89a, 89b, 89c, 89d and an OR circuit 89e.

The AND circuit 89a ANDs the set output of the FF circuit 81 (set output to the groove position signal A) and the first changing position signal B sent from the AND circuit 69. The AND circuit 89b ANDs the set output of the FF circuit 82 (set output to the first changing position signal B) and the land position signal C sent from the AND circuit 68. The AND circuit 89c ANDs the set output of the FF circuit 83 (set output to the land position signal C) and the second changing position signal D sent from the AND circuit 70. The AND circuit 89d ANDs the set output of the FF circuit 84 (set output to the second changing position signal D) and the groove position signal A sent from the AND circuit 67.

By ANDing the set outputs sent from the FF circuits 81 to 84 and the groove position signal A, the first changing position signal B, the land position signal C, and the second changing position signal D, which are respectively sent from the AND circuits 67, 69, 68, and 70, the second pulse generate section 90 outputs the pulse shown in FIG. 5Q when the radiation position of the laser beam of the optical head 3 is moved on the optical disk 1 in a forward direction, that is, "signal D→signal C→signal B→signal A→signal D, . . . and a backward direction. This shows the case shown in the left side from broken line (direction changing position) of FIGS. 5B to 5R.

The AND circuit 90a ANDs the set output of the FF circuit 81 (set output to the groove position signal A) and the second changing position signal B sent from the AND circuit 70. The AND circuit 90b ANDs the set output of the FF circuit 82 (set output to the first changing position signal B) and the groove position signal A sent from the AND circuit 67. The AND circuit 90c the set output of the FF circuit 83 (set output to the land position signal C) and the first changing position signal B sent from the AND circuit 69. The AND circuit 90d ANDS the set output of the FF circuit 84 (set output to the second changing position signal D) and the land position signal C sent from the AND circuit 68.

The pulse sent from the first pulse generate section 89 is supplied to the clock input terminal of the FF circuit 91. The pulse sent from the second pulse generate section 90 is inverted by the inverter 92, and supplied to the reset input terminal of the FF circuit 91 through the AND circuit 93. In this case, the data input terminal of the FF circuit 91 is set at a high level.

As shown in FIG. 5R, the FF circuit 91 is set when the pulse is supplied thereto from the first pulse generate section 89, and the set output (direction signal) is set at a high level. Then, the FF circuit 91 is reset when the pulse is supplied thereto from the second pulse generate section 90, and the set output (direction signal) is set in a low level. The output sent from the FF circuit 91, that is, the direction signal sent from the direction discriminate section 56b (direction detect section 56) is supplied to the track counter circuit 36. The track counter circuit 36 is changed to the up-count state or down-count state by the direction signal sent from the direction detect circuit 56. Under the changed state, the track counter circuit 36 performs the up-count or down-count every time the track pulse signal is supplied thereto from the track pulse circuit 52. For example, when the direction signal is at a high level, the up-count is performed. Then, when the direction signal is at a low level, the down-count is performed.

As a result, even in a case when the moving direction of the optical head 3 with respect to the optical disk 1 is changed to an opposite direction by an eccentricity of the optical disk 1 when the optical head moves at a low speed, the track counter circuit 36 can correctly count the track pulse by changing the up-count and down-count by the correct direction signal sent from the direction detect circuit 56.

As mentioned above, in the optical disk apparatus wherein the optical head 3 is moved in the radial direction of the optical disk 1 having a groove and a land spirally or concentrically formed on the track in an adjacent state, and the track error signal and the track addition signal are generated by detecting light from the optical disk 1 along the movement of the optical head 3, the groove position signal A, the land position signal C, the first changing position signal B, and the second changing position signal D are generated by the track error signal and the track addition signal, and the the moving direction of the optical head 3 is detected in accordance with the generation of order of the groove position signal A, the land position signal C, the first changing position signal B, and the second changing position signal D.

For example, when the land position signal C is generated after the first changing position signal B, the movement of the optical head 3 in a forward direction is detected. When the groove position signal A after the first changing position B is generated, the movement of the optical head 3 in a direction opposite to the forward direction is detected.

Thereby, the moving direction of the optical head 3 with respect to the optical disk 1 can be correctly detected.

Moreover, even in a case that the moving direction of the optical head 3 with respect to the optical disk 1 is changed to an opposite direction by an eccentricity of the optical disk 1 when the optical head 3 moves at a low speed, the up-count and down-count of the track counter circuit 36 can be changed by the correct direction signal sent from the direction detect circuit 56, and the track counter circuit 36 can correctly count the track pulse.

Furthermore, in the optical disk apparatus wherein the optical head 3 is moved in a radial direction of the optical disk 1, the track error signal and the track addition signal are generated by detecting light from the optical disk 1 along the movement of the optical head 3, the high speed noise signal of the the track addition signal is extracted through the high pass filter HF, the portion where the the high speed noise signal exists is detected by the data detect circuit 54, influence of the high speed noise signal is removed, whereby the correct direction can be detected.

Therefore, the moving direction of the optical disk 3 with respect to the optical disk 1 can be prevented from being erroneously detected by influence of the pit and the concave-convex portion excepting the gap on the optical disk 1. In other words, the moving direction, that is, the access direction can be correctly detected.

The above embodiment explained the case that data is recorded on the land. However, the present invention is not limited to the above case. The present invention may applied in a case that data is recorded to the groove.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical disk apparatus for reading data from an optical disk having tracks on which data is recorded, the tracks being formed by grooves and lands in an adjacent state, said optical disk apparatus comprising:

beam-focusing means for focusing a light beam on said optical disk;

a detector for detecting a light beam from said optical disk and for outputting a detection signal;

moving means of moving said optical beam-focusing means in a direction across said track of said optical disk;

first signal generating means for generating a track error signal and a track addition signal to said track of said optical disk in response to said detection signal output from said detector;

second signal generating means for generating a groove position signal representing a central position of said groove, a land position signal representing a central position of said land, and groove-land changing signals representing groove-land changing positions in response to said track error signal and said track addition signal generated by said first signal generating means; and detecting means for detecting a moving direction of said beam-focusing means in accordance with a generation sequence of said groove position signal, said land position signal, and said groove-land changing signals generated by said second signal generating means.

2. The apparatus according to claim 1, wherein said second signal generating means comprises:

third signal generating means for generating a track pulse signal by binarizing said track error signal; and fourth signal generating means for generating a first changing position signal when said groove-land changing position signal is generated when said track pulse signal generated by said third signal generating means is at a high level, and for generating a second changing position signal when said groove-land changing position signal is generated when said track pulse signal is in a low level;

wherein said detecting means includes logic means for detecting a moving direction of said beam-focusing means in accordance with one of said groove position signal, said land position signal and said first and second changing position signals being generated from said third and fourth signal generating means.

3. The apparatus according to claim 1, wherein said second signal generating means comprises:

means for extracting a high frequency signal from said track addition signal;

second detecting means for detecting a position of a data signal against a track width direction of said track from said high frequency signal extracted by said extracting means; and third signal generating means for generating said groove-land changing signals by logical OR-ing a signal representing said position of said data signal detected by said second detecting means and said track addition signal.

4. The apparatus according to claim 2, wherein said detecting means detects said moving direction of said beam-focusing means, based on at least one of said groove position signal and said land position signal which is generated after said first changing position signal.

5. The apparatus according to claim 2, wherein said detecting means detects said moving direction of the beam-focusing means, based on at least one of said groove position signal and said land position signal which is generated after said second changing position signal.

6. The apparatus according to claim 1, wherein said second signal generating means includes dividing means for dividing said track error signal generated by said first signal generating means by said track addition signal, thereby removing a noise component due to said data signal from said track error signal.

7. The apparatus according to claim 1, wherein said second signal generating means includes amplifying means for amplifying said track error signal generated by said first signal generating means in response to a signal level of said track addition signal generated by said first signal generating means, thereby removing a noise signal from said track error signal.

8. The apparatus according to claim 3, wherein said third signal generating means includes removing means for removing a reduction of said track addition signal, thereby removing a noise signal due to said data signal from said track addition signal, and generating a correct groove-land changing signal.

9. An optical disk apparatus for reading data from an optical disk having tracks on which data is recorded, said tracks are being by grooves and lands in an adjacent state, said optical disk apparatus comprising:

beam-focusing means for focusing a light beam on said optical disk;

a detector for detecting a light beam from said optical disk and for outputting a detection signal;

moving means for moving said optical beam-focusing means in a direction across said track of said optical disk;

first signal generating means for generating a track error signal and a track addition signal to said track of said optical disk in response to said detection signal output from said detector;

second signal generating means for generating groove-land signals representing groove-land changing positions each indicating a changing in position from said groove to said land and a changing in position from said land to said groove, a first signal representing a positive peak position of said track error signal, and a second signal representing a negative peak position of said track error signal in response to said track error signal and said track addition signal generated by said first signal generating means; and detecting means for detecting a moving direction of said beam-focusing means in accordance with a generation order relation of said groove-land signals, said first signal and said second signal generated by said second signal generating means.

10. The apparatus according to claim 9, wherein said second signal generating means comprises:

means for extracting a high frequency signal from said track addition signal;

second detecting means for detecting a position of a data signal on said track from said high frequency signal extracted by said extracting means; and third signal generating means for generating said groove-land signals by logical OR-ing a signal representing said position of said data signal detected by said second detecting means and said track addition signal.

11. The apparatus according to claim 9, wherein said detecting means detects said moving direction of said beam-focusing means, based on at least one of said first signal and said second signal which is generated after said groove-land signal generated by said second signal generating means.

12. The apparatus according to claim 9, wherein said second signal generating means includes dividing means for dividing said track error signal generated by said first signal generating means by said track addition signal, thereby removing a noise component due to said data signal from the track error signal.

13. The apparatus according to claim 9, wherein said second signal generating means includes amplifying means for amplifying said track error signal generated by said first signal generating means in response to a signal level of said track addition signal generated by said first signal generating means, thereby removing a noise signal from said track error signal.

14. The apparatus according to claim 10, wherein said third signal generating means includes removing means for removing a reduction of said track addition signal, said third signal generating means generating correct groove-land signals.

15. An optical disk apparatus for reading data from an optical disk having tracks on which data is recorded, said tracks being formed by grooves and lands in an adjacent state, said optical disk apparatus comprising:

a beam-focusing means for focusing a light beam on said optical disk;

a detector for detecting a light beam reflected from said optical disk and for outputting a detection signal;

moving means for moving said beam-focusing means in a direction perpendicular to a light axis of said beam-focusing means and a direction crossing said track of said optical disk;

amplifying means for converting said detection signal from said detector from a current to a voltage;

first generating means for generating a track error signal through a low pass filter from said amplifying means;

second generating means for generating a track addition signal through said low pass filter from said amplifying means;

third generating means for adding said signal from said amplifying means comprising:

a high frequency area;

first outputting means for outputting a track detect signal wherein a high frequency signal is removed from said track error signal using said track error signal from said first generating means and said track addition signal from said second generating means;

first binarizing means for producing a track pulse signal from said first outputting means;

second outputting means for outputting said track addition pulse signal obtained by binarizing said track addition signal from said second generating means using a predetermined value between a positive peak of a signal having no high speed data signal and a negative peak, and outputting a data detect signal obtained by binarizing a differential signal obtained from an envelope signal, said envelope signal being generated from said third generated means through a high pass filter;

second binarizing means for masking said track addition pulse signal using said data detect signal from said second outputting means, and outputting a groove land signal; and third outputting means for detecting a central position of said groove, a central position of said land, a groove-land changing position, and a land-groove changing position, from said track pulse signal from said first binarizing means and said groove-land signal from said second binarizing means, and outputting a direction signal in order of detection.

16. The apparatus according to claim 15, wherein said third outputting means outputs a first direction signal and a second direction signal opposite to said first direction signal, said apparatus further comprising:

count means for counting a track position where a light beam is focused by said beam-focusing means in response to said first and second direction signals from said first binarizing means, and for providing an up-count each time said track pulse signal is supplied from said first binarizing means where said first direction signal is output by said third outputting means, and for providing a down-count each time said track pulse signal is supplied from said first binarizing means when said second direction signal is output by said third outputting means.

* * * * *